(12) United States Patent
Urso

(10) Patent No.: US 12,521,215 B1
(45) Date of Patent: Jan. 13, 2026

(54) SENSUOUS ORAL CLEANER

(71) Applicant: Charles L. Urso, Waltham, MA (US)

(72) Inventor: Charles L. Urso, Waltham, MA (US)

( * ) Notice: Subject to any disclaimer, the term of this patent is extended or adjusted under 35 U.S.C. 154(b) by 21 days.

(21) Appl. No.: 18/445,629

(22) Filed: Nov. 29, 2023

(51) Int. Cl.
| | |
|---|---|
| *A61C 15/04* | (2006.01) |
| *A61B 17/24* | (2006.01) |
| *A61C 17/022* | (2006.01) |
| *A61C 17/26* | (2006.01) |

(52) U.S. Cl.
CPC .......... *A61C 15/047* (2013.01); *A61B 17/244* (2013.01); *A61C 15/043* (2013.01); *A61C 17/022* (2013.01); *A61C 17/26* (2013.01); *A61C 15/048* (2013.01)

(58) Field of Classification Search
CPC ....... A61C 17/06; A61C 17/08; A61C 17/084; A61C 17/088; A61C 17/092; A61C 17/096; A61C 17/12; A61C 17/125; A61C 17/13; A61C 17/135
USPC .......................................................... 132/322
See application file for complete search history.

(56) References Cited

U.S. PATENT DOCUMENTS

| | | | |
|---|---|---|---|
| 1,983,601 | A | 12/1934 | Conn |
| 3,208,145 | A | 9/1965 | Turner |
| 4,538,631 | A | 9/1985 | Prince |
| 4,672,953 | A | 6/1987 | DeVito |
| 6,602,071 | B1 * | 8/2003 | Ellion .................. A46B 11/063 |
| | | | 433/91 |
| 9,326,593 | B2 * | 5/2016 | Amron ............... A46B 11/0072 |
| 9,510,921 | B1 | 12/2016 | Urso |
| 10,709,531 | B1 | 7/2020 | Urso |

(Continued)

FOREIGN PATENT DOCUMENTS

| | | |
|---|---|---|
| DE | 69935755 T2 | 12/2007 |
| JP | 2003319944 A | 11/2003 |

(Continued)

*Primary Examiner* — Tatiana L Nobrega

(57) ABSTRACT

A comprehensive and sensuous oral cleaner (10A, 10B, 10C, and 10D) is disclosed to automate and modernize all necessary oral hygiene. The cleaner comprises a power driver (12, 12B, 12C, 12D) that can selectively power-drive a replaceable flosser attachment (13, 14, 15, 17), a replaceable synergistic multi-motion toothbrush attachment (29), and an anti-halitosis attachment (81). The driver also power-drives scent from fragrance sources (68, 24) in the attachments for sensuous ambiance while oral cleaning. The toothbrush attachment is detachably connectable to the power driver for imparting plural motions of a long-bristle toothbrush (77). These actions serve for driving long toothbrush bristles to longitudinally penetrate interdentally for power-brushing interdental contours. In the flosser attachment, a floss span is power-driven in plural motions to efficiently remove plaque as the moving span follows, scrubs, and polishes interdental contours between adjacent teeth. Three embodiments of the flosser attachment use warmed power-driven air to dry the used floss for odor-free storage until replacement of the attachment. Alternatively, two of the flosser attachment embodiments feature an antimicrobial (68) that coats the used floss to inhibit microbial activity. The power-driven anti-halitosis attachment drives a multi-bladed tongue scraper (89, 89B) along with pressurized air to neutralize causal anaerobic tongue bacteria.

18 Claims, 4 Drawing Sheets

(56) References Cited

U.S. PATENT DOCUMENTS

| | | | | |
|---|---|---|---|---|
| 11,135,042 | B2* | 10/2021 | Ouyang | A61C 17/022 |
| 11,504,215 | B2* | 11/2022 | Syed | A61C 15/048 |
| 2004/0152031 | A1* | 8/2004 | Takahashi | A61B 17/244 |
| | | | | 433/1 |
| 2007/0113374 | A1* | 5/2007 | Joshi | A46B 15/0002 |
| | | | | 15/405 |
| 2007/0163064 | A1* | 7/2007 | Wong | A46B 5/026 |
| | | | | 132/321 |
| 2011/0003264 | A1* | 1/2011 | Cohen | A61C 17/022 |
| | | | | 433/32 |
| 2014/0147252 | A1* | 5/2014 | Takano | F04D 29/2216 |
| | | | | 416/54 |
| 2014/0257173 | A1* | 9/2014 | Ohanessian | A61Q 11/00 |
| | | | | 604/23 |
| 2018/0295979 | A1* | 10/2018 | Miller | A61C 17/0202 |
| 2025/0017711 | A1* | 1/2025 | Adriaensen | A46B 15/0006 |

FOREIGN PATENT DOCUMENTS

| | | |
|---|---|---|
| TW | 201141419 A | 12/2011 |
| WO | WO2017220064 A1 | 12/2017 |

* cited by examiner

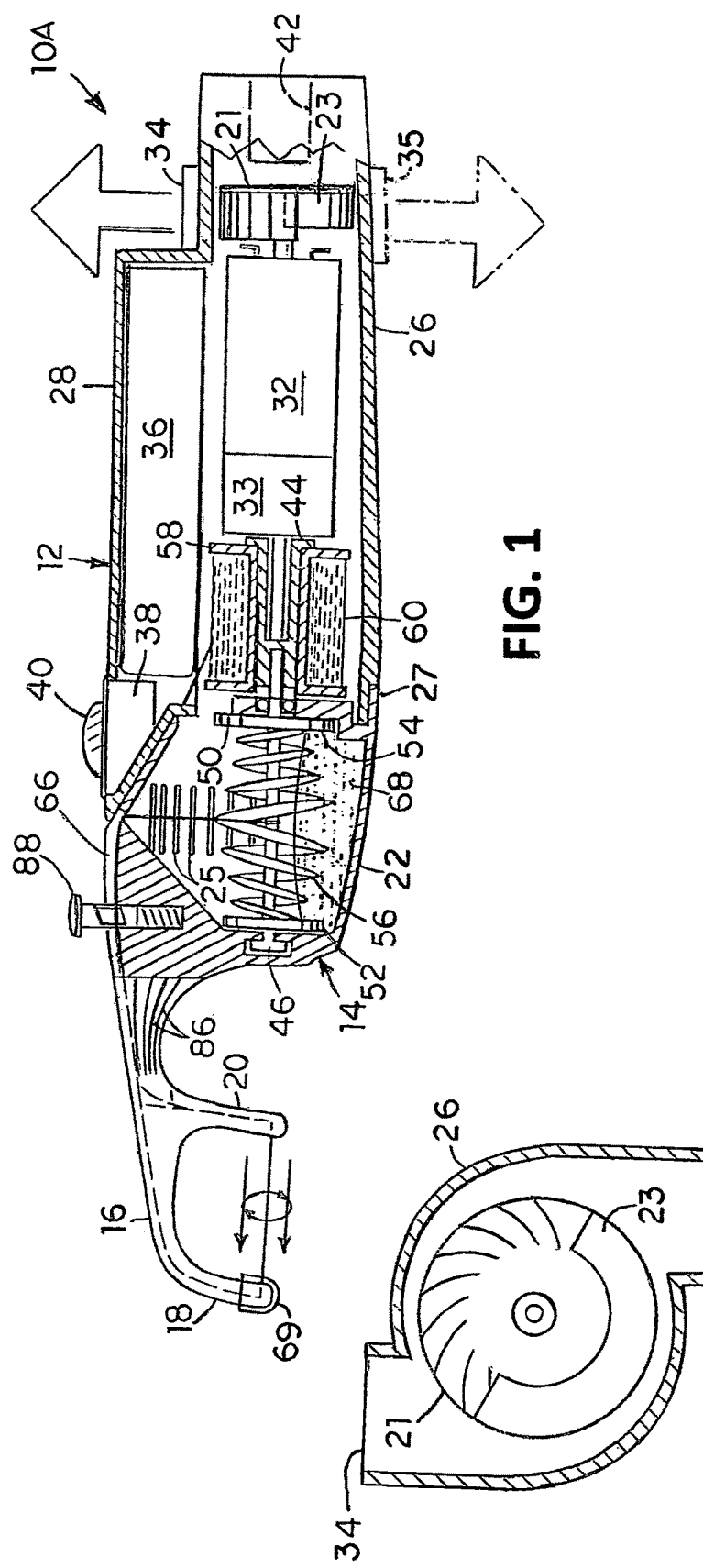
FIG. 1
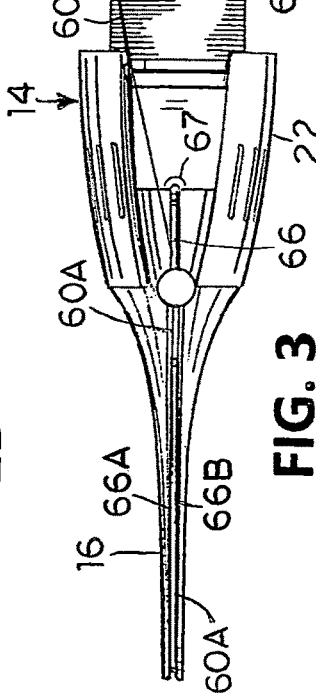
FIG. 2B
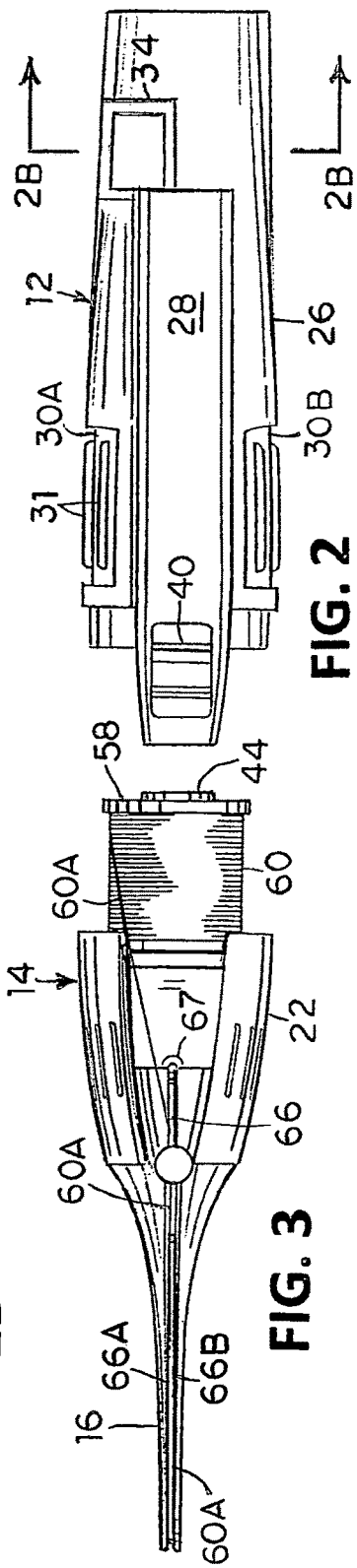
FIG. 2
FIG. 3

SENSUOUS ORAL CLEANER

CROSS REFERENCE TO RELATED APPLICATIONS

This application is related to U.S. Pat. Nos. 9,510,921 and 10,709,531.

BACKGROUND

Field

This application is related to oral hygiene devices and specifically to dental and tongue cleaning devices.

The Challange

Though daily cleaning of all dental surfaces is essential, producing a home-use device and method for thorough cleaning of all dental surfaces has been an ongoing challenge, especially for thorough interdental cleaning. Conventional interdenal cleaning devices include waxed and unwaxed floss, dental tape, manual floss picks, manual interdental brushes, H-shaped multi-jet water "flossers," and various types of toothpicks. But, all devices marketed for interdental cleaning are controversial with regard to their efficacy for prevention of oral diseases. Reports of product efficacy have been inconsistent. In product comparison tests, no interdental cleaning device has consistently stood out as being the best tool for interdental cleaning.

Dental authorities still recommend using dental floss. But manual flossing is tedious, labor-intensive, skill-dependent, and doing thorough interdental cleaning by any of the conventional methods is elusive. Hence, a comprehensive and sensuous oral cleaner disclosed herein has been devised to automate and modernize all needed oral hygiene for a more hygienic outcome. An economical embodiment has significantly fewer parts for reducing manufacturing cost.

SUMMARY

The sensuous oral cleaner includes a driver for power-driving three attachments; a toothbrush attachment, a flosser attachment, and an anti-halitosis attachment. The combination may be packaged as an oral hygiene kit. Use of the oral cleaner will save the user a substantial amount of time and effort over conventional methods of needed oral maintenance. Use of the cleaner will also result in a significantly better hygienic outcome. Regarding the flosser attachment, a pair of tines movably support a floss span connected to a large supply of dental floss. The power driver drives the floss span longitudinally and in cyclic vertical elliptical orbits. The multi-direction moving span follows, scrubs, and polishes interdental contours between adjacent teeth. This combination of flossing actions is most efficient for power-cleaning interdental contours.

Clean floss continually replaces the used floss which is automatically wiped off, drawn from the tines, and then wound onto a broad take-up spool in the attachment. The spool has means for self-distributing a high-volume of used floss along the spool core. As the used floss is wound, a reciprocating air blower in the driver induces repetitive flossing motion of the floss span and blow-dries used floss for odor-free storage. The driver drives the orbital motion of the attachments and also drives a sensuous fragrant scent from a fragrant antimicrobial into ambient room air. Thus, the user has a pleasant sensuous experience while power-cleaning his or her teeth. The flosser attachment is disposable for eventual replacement with a new one containing a large supply of fresh floss.

When the toothbrush attachment is actuated, the power driver imparts a high-speed cyclic elliptical orbit about a first axis of a long-bristle toothbrush while also driving rotational movement of the toothbrush about a second axis. The first and second axes are perpendicular to each other wherein the rotation rate is low and the orbital rate is high. Slower rotational momentum prevents flaring of the long bristles and also avoids skipping interdental contours. Simultaneously, the high-speed orbital motion drives interdentally aligned bristles to penetrate interdentally for following and brushing the interdental contours. The rest of the bristles brush the tooth faces to result in all-surface dental brushing. The orbital and rotational bristle-driving motions act transversely to each other to result in deep synergistic interdental cleaning. In combination with the flosser attachment, all dental surfaces can be accessed for thorough power cleaning.

The anti-halitosis attachment serves for treating common halitosis of bacterial origin. This novel power-driven attachment is included because halitosis (foul smelling breath) is very common but can be a difficult problem to resolve. The anti-halitosis attachment utilizes an aerobic treatment method that power-disrupts tongue biofilm and power-drives a warmed airstream with a sensuous fragrance scent directly at the tongue surfaces. This chemical-free treatment kills causal anaerobic bacteria by oxidation and leaves the user with a refreshed sensuously aromatic tongue and oral cavity.

Advantages

Power Driver Advantages

The power driver has seven important advantages: (1) Drives floss in cyclically elliptical orbits for following, scrubbing, and polishing interdental contours when flossing teeth; (2) Blow-dries used floss for inhibiting microbial odor; (3) Drives interdentally aligned bristles of the long-bristle toothbrush attachment longitudinally to penetrate interdentally for all-surface brushing; (4) Drives gratifying fragrant scent from internal fragrance sources into ambient room air for user gratification while cleaning teeth; (5) Air-cools the driver motor for maximum performance and protection from heat; (6) Drives a warmed and sensuously fragrant airstream from the anti-halitosis attachment for neutralizing anaerobic bacteria by oxidation and for refreshing the tongue and oral cavity with a pleasant scent; and (7) Blows out and blow-dries water if any gets into the cleaner housing during rinsing.

Toothbrush Attachment Advantages

As described herein, the long-bristle toothbrush is driven in high-speed cyclic elliptical orbits about a first axis while the brush is rotated about a second axis perpendicular to the first axis. This drives interdentally aligned long bristles longitudinally to deeply penetrate interdentally. High-speed elliptical orbital cycles of the deeply penetrating long brush bristles orbit longitudinally while rotating for deep synergistic frictional cleaning of interdental surfaces.

The major axis of the ellipse of the high-speed elliptical orbit of the flosser attachment is aligned with the flossing tines. Therefore, when flossing between teeth, the major axis of the elliptical orbit is aligned with the interdental contours being flossed. This causes the floss to follow the interdental contours of adjacent teeth and maximizes scrubbing and polishing of the interdental surfaces.

Anti-Halitosis Attachment Advantages

A bladed nozzle in the attachment is driven with the orbital driving action and air-driving dynamics of the driver to disrupt and clear away tongue biofilm. Simultaneously, a broad stream of warmed air is driven and directed to strike, oxidize, and kill causal anaerobic bacteria by oxidation on and between the tongue papillae. A sensuous fragrant scent is included in the driven airstream to deodorize and refresh the tongue and oral cavity with a pleasant scent. Successful control of halitosis has very broad social and psychological ramifications for the populations afflicted by the problem.

DRAWINGS—FIGS. 1-11

The accompanying drawings in combination with the description herewith illustrate features of embodiments. Like reference numerals refer to the same parts. The drawings are not necessarily to scale.

FIG. 1 is a side view of a first embodiment of the oral cleaner shown mostly in section taken through a longitudinal midline wherein the driver is detachably connected to a flosser attachment.

FIG. 2 is a top view of the power driver of the oral cleaner of FIG. 1 wherein the power driver is detached from the flosser attachment.

FIG. 2B is an enlarged anterior cross-sectional view of a reciprocating air blower portion of the oral cleaner of FIG. 1.

FIG. 3 is a top view of the flosser attachment of the oral cleaner of FIG. 1 wherein the flosser attachment is detached from the power driver.

Figure 5:
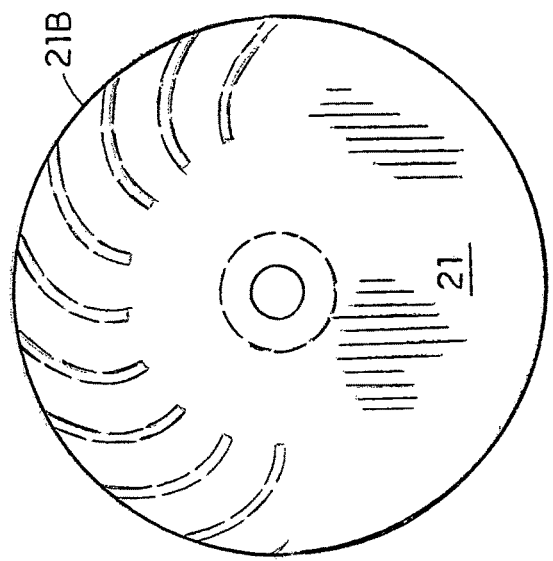
FIG. 5 is an enlarged posterior view of the eccentric impeller of the oral cleaner of FIG. 1.
Figure 4:
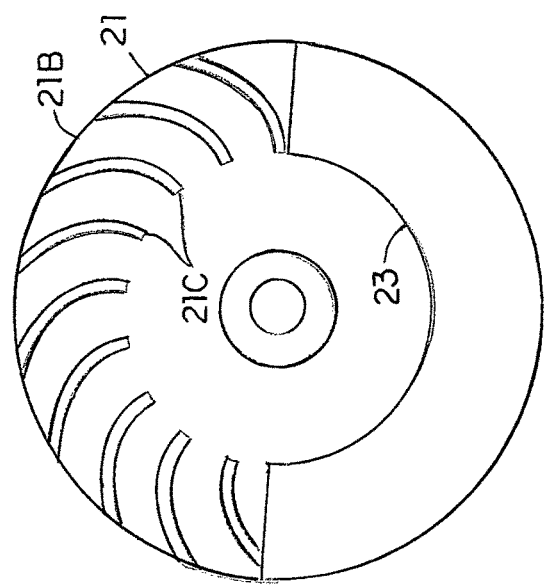
FIG. 4 is an enlarged anterior view of an eccentric centrifugal air impeller of the oral cleaner of FIG. 1 showing a multi-functional weight shaped like a half-pipe section on the anterior side of the impeller.

DETAILED DESCRIPTION OF A FIRST EMBODIMENT—FIGS. 1-2, 2B, and 3-5

Beginning with FIG. 1, a first embodiment of the sensuous oral cleaner 10A is shown mostly in longitudinal cross-section. Cleaner 10A includes an elongate power driver 12 and a flosser cartridge or flosser attachment 14 detachably connected to driver 12. The attachment includes an elongate rigid plastic flossing frame or bifurcated member 16 forming a pair of flossing tines 18 and 20. FIG. 3, in a top view, shows attachment 14 detached from driver 12. Bifurcated member 16 is fixed to a hollow plastic housing or capsule 22. Attachment 14 is explained in detail herein after a detailed explanation of driver 12.

Power Driver 12—FIGS. 1-2, 2B, and 4-5

Referring back to FIG. 1, power driver 12 includes an elongate hollow plastic main housing 26 integrated in parallel with a smaller elongate plastic power cell housing 28. Both housings are designed and shaped to conform with capsule 22 of flosser attachment 14. Both housings 26 and 28 are made of rigid plastic except for a pair of opposed flexible elastomeric panels 30A and 30B (FIG. 2) comprised of molded elastomeric rubber. Both panels are attached by conventional means to cover opposing windows, respectively, defined in an anterior end portion of housing 26. Each panel 30A and 30B presents a mirror image of the other and each panel includes longitudinal ribs 31 integrally molded thereon. Ribs 31 provide slip resistance and their flexibility allow see-saw motion of cleaner 10A when held by a user. The functions of elastomeric panels 30A and 30B are explained in the Operation of Oral Cleaner 10A section hereinafter.

In FIG. 1, a dual-shaft gear motor 32 is mounted within housing 26 by conventional means. Motor 32 has a speed-reduction gearbox 33 for driving the motor anterior shaft at reduced speed. A posterior drive shaft of motor 32 is coaxially fixed by press fit in a mounting collar at the hub of an eccentric centrifugal impeller 21 shown in FIGS. 1, 2B, 4, and 5. Impeller 21 is housed in an air blower housing portion of housing 26 (FIG. 2B) that forms two volutes oppositely oriented such that they curve and widen in opposite directions from each other. The volutes terminate at discharge ports 34 and 35, respectively, directed in opposite directions from each other. Discharge port 34 is at the top of the housing and discharge port 35 is at the bottom of the housing.

Impeller 21 has a rotational axis and a circular plate 21B (FIGS. 4-5) from which impeller blades 21C fixedly extend from only one half of plate 21B resulting in half of the impeller having the predominant air-driving surface area. Expressed another way, the length of the rotational axis of impeller 21 is in a plane wherein blades 21C and their centrifugal air-driving surfaces are predominantly on only one side of the plane. Impeller blades 21C extend in length outwardly from the impeller hub and extend in width toward the anterior end of driver 12. As impeller 21 rotates, the bladed half drives an air load out through air discharge ports 34 and 35 alternately. Thus, in each cycle of impeller rotation, the volutes guide impeller driven air to discharge from ports 34 and 35 alternately in opposite directions.

Plate 21B and its blades 21C are rigid plastic molded as a unit and are fixedly attached with adhesive to a steel weight 23 mounted on the anterior side of plate 21B. Weight 23 is shaped like a section of half-pipe and only overlaps the half of circular plate 21B without the impeller blades. In other words, weight 23 is on the opposite side of the mentioned plane relative to the side having the impeller blades wherein the weight or mass of impeller 21 is greater on the side having weight 23. A semi-circular inner surface of weight 23 guides incoming air toward a central region of the impeller to be driven outward through the impeller periphery by blades 21C. Eccentric impeller 21, together with motor 32 and the oppositely directed volutes, as described above, are included in a centrifugal reciprocating air blower. Several advantages of the reciprocating air blower are explained in the Operation of Oral Cleaner 10A section below.

FIG. 1 shows that within housing 28 is a rechargeable power cell 36. A conventional DC momentary reversible rocker switch 38 is conventionally mounted within a window defined in an anterior end portion of housing 28. Switch 38 includes a power button 40 positioned exteriorly of housing 28. Switch 38 is electrically connected to power cell 36 and motor 32 to energize the motor for rotating its drive shafts in forward or reverse directions when button 40 is rocked forward or rearward, respectively. An electric circuit (not shown) electrically connecting power cell 36, switch 38, and motor 32 is conventional. Power cell 36 is rechargeable by means of a conventional base charging peg (not shown) inserted in a peg chamber 42. A conventional battery charging coil (not shown) enables power cell 36 to be electrically charged.

The anterior drive shaft of motor 32 has a hex-shaped cross section so that the drive shaft is keyed to mate with oral cleaning attachments. In flosser attachment 14, the drive shaft is coaxially and detachably received in an elongate posterior cavity defined in an elongate spindle 44 of attachment 14. The spindle cavity is hex-shaped in cross-section to engage with the anterior drive shaft of motor 32 of the air blower.

Flosser Attachment 14—FIGS. 1 and 3

Spindle 44 (FIGS. 1 and 3), introduced above, is coaxially and fixedly press fitted onto a posterior end portion of a driven shaft 46. A flanged anterior end portion of shaft 46 is rotatably supported and is retained in a disk-shaped cavity defined in an anterior portion of capsule 22. A posterior end portion of shaft 46 is rotatably supported in a shaft bearing fitted in a recess in a partial partition molded transversely to a side wall of capsule 22.

A central portion of shaft 46 forms the core hub of an elongate floss take-up spool 50 having end flanges 52 and 54 wherein spool 50 is enclosed in capsule 22. Floss distributing augers 56, each threaded with an oppositely directed flight than the other, are joined together to form a generally bicone-shaped spool core and are coaxially fixed to shaft 46. Augers 56 function to broadly distribute used floss onto the entire length of spool 50, as explained in U.S. Pat. No. 9,510,921 which is incorporated herein by reference in its entirety, thereby enabling large floss storage capacity in the attachment housing.

To inhibit microbes and the odor they generate, augers 56 are partially submerged in a semisolid combination consisting of 8% fragrance oil blended in Globe Dual Action Cream.® This unusual and fortuitous combination is not heavily viscous like gels or ointments and does not impose significant drag resistance on motor 32. The blend forms aromatic antimicrobial cream 68 and is supported proximate to the core of spool 50 in attachment capsule 22. As arranged, it continuously engages and coats incoming used floss being wound. Use of cream 68, as described, has several important advantages over liquids and other forms of antimicrobials. Cream 68 is lighter in weight, doesn't flow, doesn't spill, doesn't leak, and continuously engages and coats the used floss in any position of the cleaner, even when the cleaner is upside down. Therefore, attachment 14 and driver 12 don't need to be fluid tight and therefore don't require air pressure reduction for storage of large amounts used floss. And because of the low viscosity and low resistance of cream 68, it doesn't require more motor power. Open passages leading from air intake vents 25 (FIG. 1), perforating lateral walls of capsule 22, lead air to air discharge ports 34 and 35 at a posterior end portion of the driver.

Spindle 44, shown in FIGS. 1 and 3, includes a posterior end portion forming a flange that retains a floss supply spool 58 having a large supply of clean floss 60 wound thereon. Spool 58 fits loosely on spindle 44 to slip around the spindle as floss is drawn from spool 58. FIG. 3 shows that a floss strand 60A, extending from floss supply 60, passes through a guide groove 66 extending along bifurcated member 16. The floss strand then extends into a guide groove of flossing tine 20 (FIG. 1). From there the floss strand spans to tine 18 and into a guide groove therein to form a floss span between the tines.

From tine 18, floss strand 60A (FIG. 3) extends along groove 66 on the outer surface of capsule 22 and then the floss enters the capsule through an annular aperture 67. Finally, the strand extends to the middle of the core of take-up spool 50 (FIG. 1) and is attached thereto. Hence, when spool 50 is driven to rotate, used floss is wound thereon within capsule 22.

A soft elastomeric floss wiping boot 69 covers a distal end portion of tine 18. Boot 69 is a rubber thimble-shaped elastomer cover split vertically into two symmetrical haves and glued to tine 18. However, the circumferential interface between the split halves is left free of glue and the interface is aligned with the floss guide groove of tine 18. Therefore, used floss must first squeeze between the tight elastomer interface of boot 69 to enter the guide groove. Thus, as used floss enters the guide groove of tine 18, plaque debris on the used floss is wiped off and is blocked from entering the groove. (Boot 69 could alternatively be made of silicone or other soft elastomer.) Boot 69 also functions to absorb vibration if the tine contacts teeth when the flosser is operating.

Within capsule 22, the pendular floss has sufficient angular swing space to traverse the entire length of the elongate core of spool 50 when rotating. Hence, the elongate spool core can wind and store a substantial amount of used floss until disposal of attachment 14.

Capsule 22 conforms contiguously with power cell housing 28 and main driver housing 26 to form a space-efficient streamlined body and handle of dental cleaner 10A. The means for attaching attachment 14 include a circumferential lip 27 extending from a posterior end portion of capsule 22 to overlap an indented anterior end portion of housing 26. Conventional minute circumferential friction ridges (not shown) on the inner side of lip 27 are received in conventional minute circumferential friction grooves (not shown) defined in the indented end portion of housing 26 to hold attachment 14 and driver 12 together. Slight flexibility of plastic lip 27 enables the lip to flex sufficiently for a user to attach or detach attachment 14.

Operation of Oral Cleaner 10A—FIGS. 1, 2, 2B, and 3

A user will normally hold cleaner 10A by gripping slip-resistant panels 30A and 30B with the fingers of one hand. By pushing button 40 forward, motor 32 is energized to drive floss take-up spool 50 to wind used floss. Thus, flossing can commence as the floss span is continuously being replaced. Longitudinal and orbital movement of the floss span powered by motor 32 makes it easier for the user to pass the span between tightly abutting teeth. Alternatively, the user can grip the cleaner at neck surface ribs 86 for close-up control to pass the floss span between very tightly abutting teeth. Then, by holding cleaner 10A at panels 30A and 30B as the cleaner is operating, the user's fingers create a see-saw fulcrum where the cleaner is held. With each cycle that impeller 21 rotates, the driven air is guided out of the housing alternately in opposite directions through oppositely positioned and directed volute discharge ports 34 and 35 as indicated by the large arrows in FIG. 1. The driving forces of eccentric impeller 21 include a pushing force of its eccentric distribution of blades 21C against a resulting imbalanced air load together with a centrifugal pulling force of its eccentric weight 23. Together these forces urge the end portions of cleaner 10A to move in an elliptical pattern secondary to each rotation cycle of impeller 21. The elliptical movement is mechanically transmitted through cleaner 10A to result in an elliptical orbit of the floss span indicated by the elliptical arrow in FIG. 1. Very little vibration is felt at the fulcrum where held by the user's fingers because elastomeric rubber panels 30A and 30B and the flexibility of its rubber ribs 31 absorb vibration. The orbit is of greatest magnitude at the two distal ends of cleaner 10A.

Optionally, auxiliary vibration-absorbing ribbed panels (not shown) similar to panels 30A and 30B, but having adhesive backs, may be attached on the cleaner housing wherever the user prefers to hold cleaner 10A. In effect, when the oral cleaner is held by a user's fingers, both opposite end portions of cleaner 10A are driven in an elliptical orbital see-saw motion by the reciprocating air blower. The major axis of the elliptical orbit is aligned with flossing tines 18 and 20. Therefore, when the floss is between adjacent teeth, the major axis of its elliptical orbit is interdentally aligned. Thus, the floss span will automatically follow, scrub, and polish interdental contours. The action of the floss span can be directed down to the attached gum tissue to interdentally clean and polish both adjacent teeth. The vertical elliptical orbiting floss motion is especially efficient for following the interdental contours while flossing them.

Used floss is wound and distributed along spool 50 by augurs 56 while motor 32 is energized. The augurs keep incoming used floss in contact with antimicrobial cream 68. This prevents the occurrence of unpleasant odors. As the floss is wound, the floss builds up on the augur flights thereby enlarging the diameter of the wound floss. As the diameter increases, it continuously penetrates deeper into the antimicrobial cream. Thus, wound floss on the surface of the flights continuously engages with antimicrobial cream 68 thereby coating the floss lengthwise to inhibit microbes and prevent odor.

While the floss is winding, the blower impeller draws air into cleaner 10A through air intake vents 25 and then out through discharge ports 34 and 35. That causes rapidly moving air to blow-dry moisture from the used floss just before the antimicrobial treatment. Thus, the used floss gets two antimicrobial treatments: one from blow-drying, and the other from the semisolid antimicrobial treatment. The incoming rapidly driven air also forcibly picks up fragrant scent from cream 68 wherein the scent is driven by the blower to the exterior of the cleaner housing and into the ambient room air. Most people do their dental cleaning in their bathroom where pleasant fragrance is often needed. Hence, the user is sensuously gratified with a pleasant fragrant ambiance while his or her teeth are being efficiently power-cleaned.

The user controls floss span tension by the amount of finger pressure applied to flexible panels 30A and 30B. When compressed by the user, the elastomeric inner surface of each panel engages and imposes drag on floss spool 58 positioned axially parallel to the panels. Ribs 31 thereby control floss span tension according to the amount of user finger pressure on the ribs. In the unlikely event that the floss span gets snagged on a dental appliance, the user can release finger pressure on panels 30A and 30B. Thus, the cleaner can be removed from the user's mouth wherein the floss is allowed to payout from the supply spool. The extended floss can be dislodged and then power-wound on the take-up spool 50 so flossing can resume. Another way to payout floss, if necessary, is by pivoting button 40 rearward so motor 32 will operate in reverse to unwind some floss from take-up spool 50.

Safety Floss Cutter—FIGS. 1 and 9-11

Attachment 14 includes a floss cutter 88 as an added safety feature for cutting floss in the unlikely event that the floss span gets snagged on a dental appliance in the user's oral cavity. Floss cutter 88 is positioned through and across elongate floss guide groove 66 that guides floss on route from supply spool 58 to flossing tines 18 and 20 and then to take-up spool 50. Clean floss and the used floss are spaced apart in guide groove 66 by sub-grooves 66A and 66B, respectively. Cutter 88 does not impede normal floss flow in guide groove 66. But, if necessary, cutter 88 can be pressed to cut off a loop of floss strand 60A in guide subgrooves 66A and 66B that are going to and coming from tines 18 and 20. The user can then draw floss out of spool 58 to tie the severed floss end portions together and can resume flossing. The details of the floss cutter are explained in U.S. Pat. No. 10,709,531 which is incorporated herein by reference in its entirety.

Figure 6:
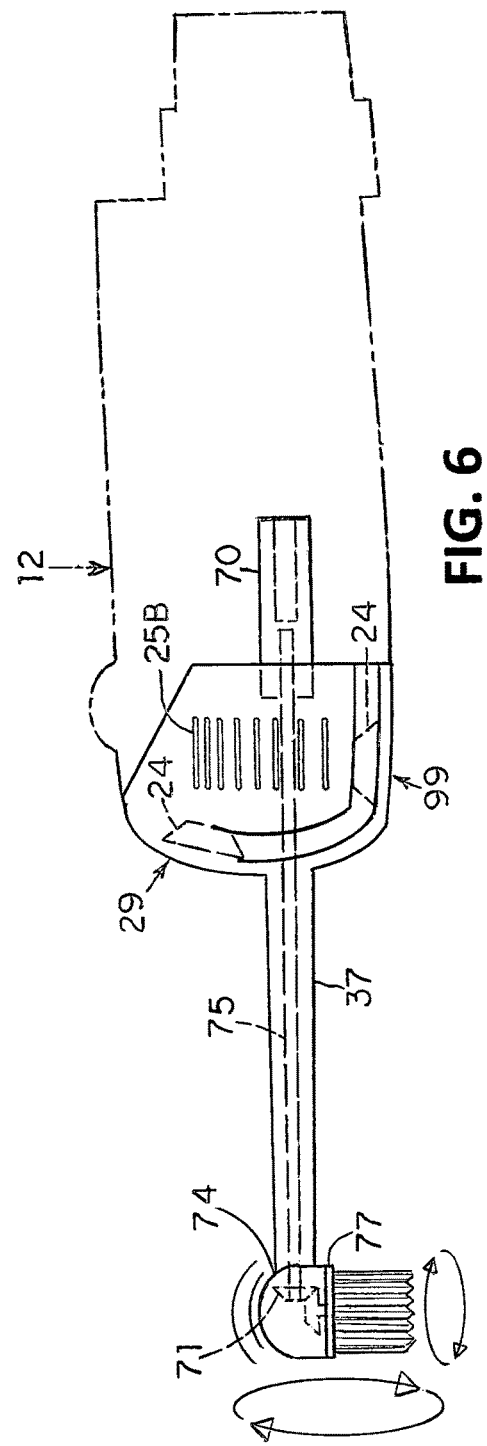
FIG. 6 is a side view of a synergistic multi-motion toothbrush attachment detachably connected to the power driver of FIG. 1 indicated in phantom image.

Synergistic Multi-Motion Toothbrush Attachment—FIG. 6

A synergistic multi-motion toothbrush attachment 29 in FIG. 6 is detachably connectable to the anterior motor drive shaft of power driver 12. Like flossing attachment 14, toothbrush attachment 29 includes air intake vents 25B. Fragrance tablets 24 provide fragrant scent so that the driver air blower system can drive the scent into the ambient room air.

Attachment 29 includes an elongate tube-like neck 37 rotatably supporting a driven shaft 75 therein. A posterior end portion of shaft 75 is coaxially fixed to a connecter 70 having a horizontal cavity of hex-shaped cross-section for detachably receiving the anterior drive shaft of driver motor 32. An opposite end portion of shaft 75 is coaxially fixed to a bevel gear 71 rotatably supported by and within a hollow dome-shaped toothbrush head 74. Gear 71 is drivingly engaged with a second bevel gear coaxially fixed to a short shaft rotatably supported in toothbrush head 74. The short shaft is coaxially fixed to a circular toothbrush 77 having a cluster of long bristle tufts.

Therefore, when driver motor 32 is energized, the motor drives impeller 21 which drives toothbrush 77 to orbit about a first axis which is approximately perpendicular to the lengths of the bristles. Simultaneously, motor 32 rotates toothbrush 77 about a second axis which is perpendicular to the orbital or first axis by being angled 90 degrees thereto and is approximately parallel to the lengths of the bristles. The cyclical rate of orbital motion of toothbrush 77 about the first axis is substantially higher than the cyclical rate of rotational motion of toothbrush 77 about the second axis. The difference results because of the rotation rate reduced by speed reduction gearbox 33.

The low rotational rate of toothbrush 77 allows it to have longer bristles because they avoid centrifugal flaring. The lower rotational rate also minimizes transverse momentum thereof to avoid skipping interdental contours. When toothbrush 77 is in conventional buccal and lingual brushing positions, some of the orbiting bristles will momentarily be interdentally aligned.

Hence, the power-driven bristles will penetrate interdentally and engage interdental contours to follow and brush between teeth while orbiting and rotating. Simultaneously, the long penetrating bristles will cyclically alternate in and out of interdental positions by the rotation of toothbrush 77. The two simultaneous motions of long-bristle toothbrush 77 about orbital and rotational axes perpendicular to each other result in deep synergistic interdental cleaning.

Commercial power brushes that only rotate a toothbrush about an axis parallel to the bristle length have short bristles to prevent centrifugal flaring of the bristles. They also tend to skip over interdental contours because of their short bristles and because their momentum is transverse to the interdental depth direction.

Figure 7:
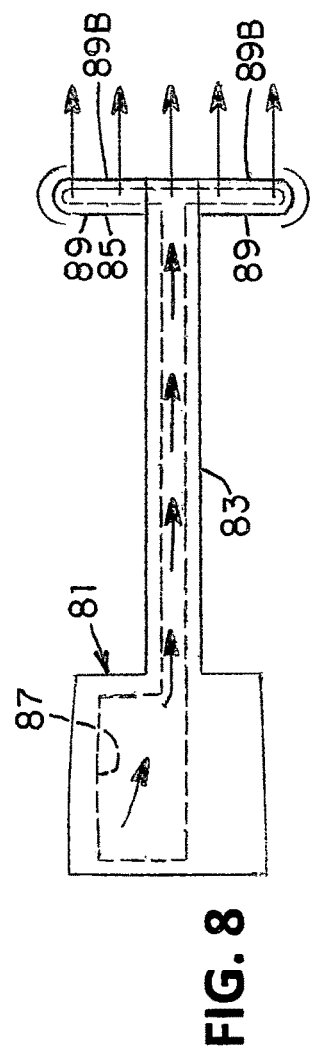
FIG. 7 is a side sectional view of an anti-halitosis attachment detachably connected to a posterior end portion of the power driver in FIG. 1 wherein the section is taken through the longitudinal midline of the attachment.
Figure 8:
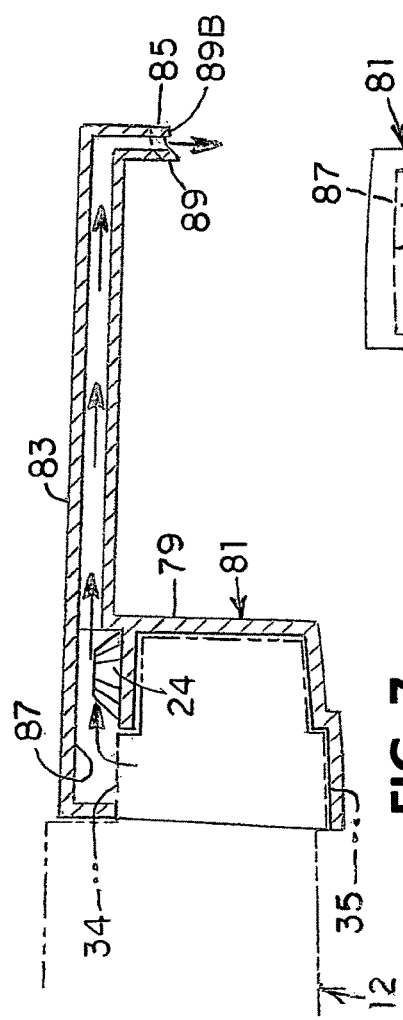
FIG. 8 is a top view of the anti-halitosis attachment of FIG. 7.

Anti-Halitosis Attachment—FIGS. 7 and 8

Starting with FIG. 7, the anti-halitosis attachment 81 is shown detachably connected to a posterior end portion of driver 12 wherein the end portion of driver 12 is indicated in phantom image. No other attachment would normally be attached to driver 12 when using attachment 81. This attachment is comprised entirely of rigid plastic and includes a base 79 molded to conform tightly around discharge ports 34 and 35 and the indicated end portion of driver 12. Base 79 covers and blocks port 35 so that all the driven air is discharged from port 34. From there, the air indicated by arrows enters a chamber 87 (FIGS. 7 and 8) defined by walls of base 79 molded such that chamber 87 is in fluid communication with a mostly straight tube 83 extending from base 79.

Tube 83 is rigid and long enough to reach the back of an adult user's tongue. An end portion of tube 83 bends downward ninety degrees and joins onto the middle of a broad oxidizing nozzle 85. The nozzle is shaped like an upside-down trough and is in fluid communication with the driver air blower by way of chamber 87 and tube 83. The discharge outlet of nozzle 85 is elongate and normally directed downward. The elongate outlet is defined by a first wall serving as a first scraping blade 89 and a second wall serving as a second scraping blade 89B narrowly spaced and approximately parallel to the first blade. Blade 89 has a narrower distal edge and is a bit more protrusive than blade 89B. The exposed distal edge of each plastic blade is acute enough for power-scraping tongue biofilm, but is not sharp enough to cut tissue. Nozzle 85 and its blades 89 and 89B serve for power-scraping and clearing biofilm from the tongue while simultaneously guiding a broad airstream jet directly at the surface of the tongue.

Initially, when air is driven by the air blower, the air passes through driver 12 and is mildly warmed by absorbing heat from cooling motor 32. Thus, when anti-halitosis attachment 81 is connected to driver 12 while operating, the broad airstream emitted and directed from oxidizer nozzle 85 is comfortable for the user. A sensuous fragrance tablet 24 (explained in the Third Oral Cleaner Embodiment section below) is adhered to the inside surface of chamber 87 by adhesive and is in the airstream passing through chamber 87. The fragrance scented airstream then passes through tube 83 and jets out of nozzle 85.

Thus, when the user needs to rid the tongue of anaerobic bacteria that causes halitosis, the user can power-stroke the surface of the tongue with oxidizer nozzle 85 while driver 12 operates. As the driver's posterior end portion undergoes orbital motion driven by the reciprocating air blower, nozzle 85 orbits as well. The rapidly orbiting nozzle blades 89 and 89B disrupt and clear away the tongue's biofilm as the tongue is cyclically scraped. Simultaneously, biofilm debris and halitosis-causing anaerobic bacteria between the tongue papillae are exposed to the strong jet of warmed and fragrant air striking downward from oxidizer nozzle 85. The downward air strike causes air oxygen to oxidize and kill culprit anaerobic bacteria. As indicated by the arrows in FIG. 8, the air that deflects off of a tongue's surface flows under the shorter second blade 89B. Then the fragrant pressurized air will circulate around the rest of the oral cavity. The sensuously scented airstream will therefore leave the user with a pleasantly refreshed and fragrant tongue and oral cavity.

Plaque bacteria on dentition and gum disease are also causes of halitosis. Hence, toothbrush attachment 29 and flosser attachment 14 described herein will also help to prevent halitosis by getting rid of plaque bacteria and by preventing gum disease.

Figure 9:
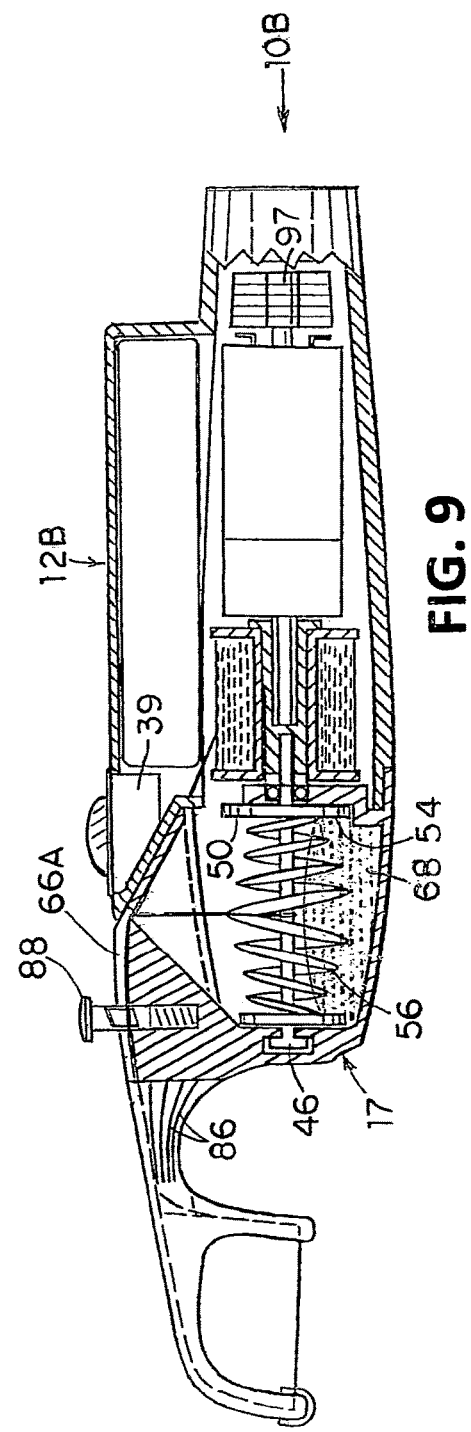
FIG. 9 is a side view of a second embodiment of the oral cleaner shown mostly in section taken through the longitudinal midline wherein the flosser attachment and the driver are modified.

Second Oral Cleaner Embodiment—FIG. 9

FIG. 9 shows a second embodiment identified as oral cleaner 10B which is similar to cleaner 10A and includes a flosser attachment 17 detachably connected to a driver 12B. Significant differences include an eccentric weight 97 that replaced impeller 21. Antimicrobial cream 68 is the means of inhibiting microbial activity. Thus, oral cleaner 10B can do interdental cleaning and drive synergistic multi-motion toothbrush attachment 29, and do the job of storing used floss without odor. But, it does not have the air blower advantages of the first embodiment.

Figure 10:
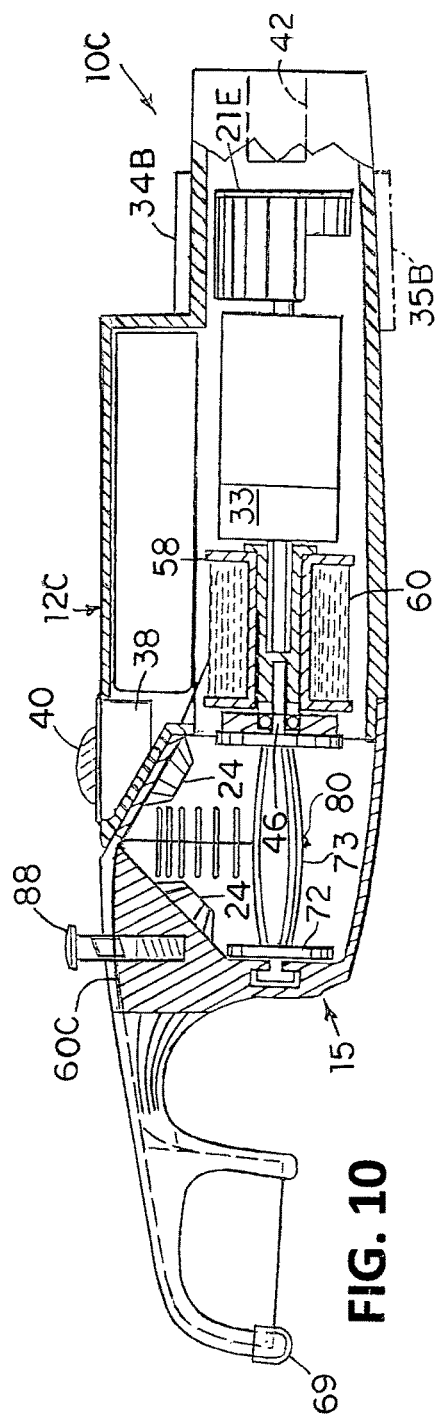
FIG. 10 is a side view of a third embodiment of the oral cleaner shown mostly in section taken through the longitudinal midline wherein the flosser attachment and the driver are modified.

Third Oral Cleaner Embodiment—FIG. 10

FIG. 10 shows a third embodiment identified as oral cleaner 10C which includes a flosser attachment 15 detachably connected to a driver 12C. Attachment 15 is similar to that of attachment 14 except for the following differences: A take-up spool 72 replaced take-up spool 50. Included in spool 72 is an elongate bicone-shaped core 73 having opposite terminal ends and a middle 80 that is equidistant from each of the ends. Core 73 includes a hard plastic body surrounding and coaxially fixed to a central portion of shaft 46. Thus, core 73 is tapered such that the diameters of the core are progressively smaller as the distance increases away from the middle 80. Therefore, the terminal ends have the narrowest core diameters. The tapering of core 73 makes floss wound thereon prone to slide toward the smaller core diameters. Floss is initially anchored perpendicularly to the middle 80 of core 73 by being tied through a tiny aperture therein. Hence, whenever tensioned floss is wound on the slippery tapering core 73, the latest floss loops wound thereon tend to forcibly displace some of the previous loops (other than the first or anchored loop) away from the middle 80. The displaced floss loops slide incrementally toward the ends of the core by sliding over less-resisting smaller core diameters and over smaller floss loops. This enables used floss to be distributed along the length of elongate core 73 for high-capacity floss storage.

After the incoming used floss is wiped by boot 69, any remaining oral microbes on used floss being wound on spool core 73 are inhibited of microbial activity by fast blow-drying with an eccentric impeller 21E which is similar to impeller 21, but has longer blades. In this embodiment, fragrant aroma is provided by fragrance tablets 24 molded from conventional solid sensuous fragrance and attached with adhesive to inside surfaces of attachment 15. The blower system for blow-drying the used floss and for transmitting the fragrance to the user of oral cleaner 10C is similar to that of cleaner 10A. The discharge ports 34B and 35B, however, are larger to discharge a greater volume of air.

If limited amounts of water enter the cleaner when rinsing the tines after use, the water will readily drain from the vents or ports. Otherwise, the driver air blower will blow out and dry water that enters. Driver 12C also drives the other described attachments.

Figure 11:
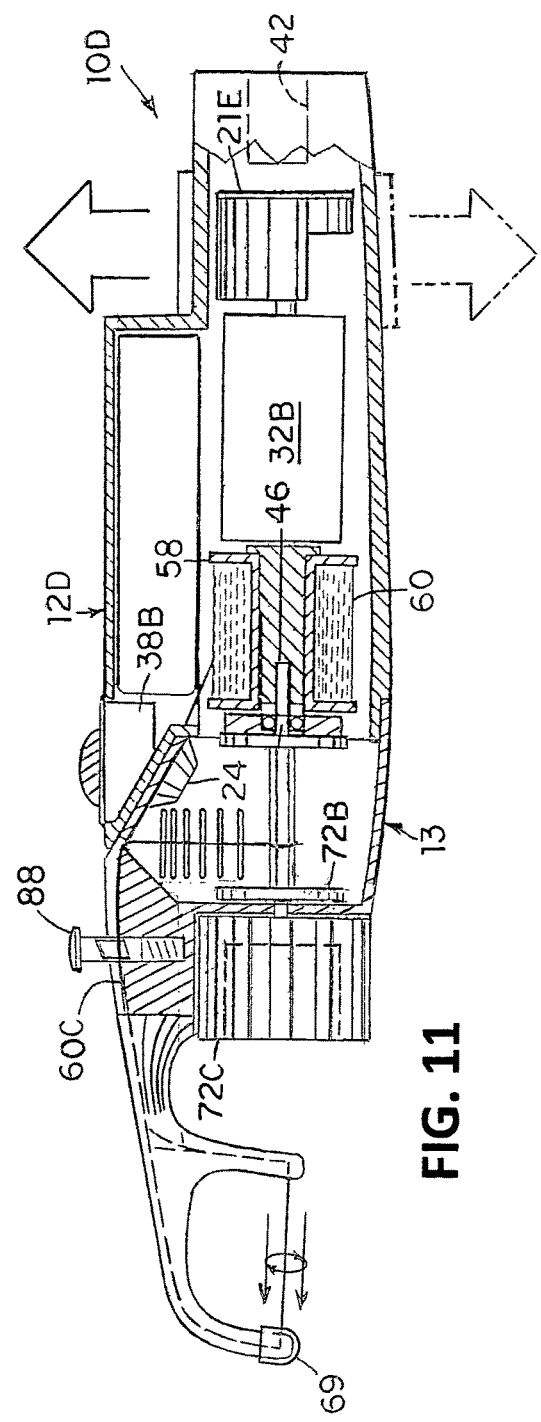
FIG. 11 is a side view of a forth embodiment of the oral cleaner shown mostly in section taken through the longitudinal midline wherein the flosser attachment and the driver are modified.

Forth Oral Cleaner Embodiment—FIG. 11

FIG. 11 shows a forth embodiment identified as oral cleaner 10D. To be more broadly affordable, this embodiment is of significantly lower cost to produce then the embodiments described above. Dental cleaner 10D is similar to cleaner 10C except for the following differences: Switch 38B is an ON-OFF switch instead of momentary switch 38. One of the most significant cost-reducing changes is that there is no dual shaft gear motor. Instead, eccentric impeller 21E is driven by a simpler single shaft electric motor 32B without gears. Therefore, to drive a take-up spool 72B to wind used floss, a flexible fulcrum handle 72C comprised of elastomeric rubber is coaxially and drivingly fixed to an anterior end portion of driven shaft 46. Fulcrum handle 72C is positioned between the bifurcated member and the see-saw drive system including eccentric impeller 21E. When the user holds dental cleaner 10D by fulcrum handle 72C during operation of the cleaner, the handle becomes a see-saw fulcrum and functions accordingly.

Handle 72C is a circular wheel partly hollow as indicated by the broken lines therein. When a user is gripping the fulcrum handle between a thumb and forefinger as the cleaner operates, rubber fulcrum handle 72C flexes to enable the see-saw motion of cleaner 10D. The flexibility of fulcrum handle 72C also absorbs vibration for user comfort. The position of fulcrum handle 72C adjacent the flossing tines and axially parallel to the floss span enables easy insertion thereof between adjacent teeth. By being very close to the floss span, fulcrum handle 72C also enables the user to maximize control of the floss insertions. While the drive system drives the cleaner to follow, scrub, and polish interdental contours, the user can periodically advance the floss by a half turn of fulcrum handle 72C already in hand. This forth embodiment is economical and its driver 12D can drive all of the described attachments.

CONCLUSION, RAMIFICATIONS, AND SCOPE

The sensuous oral cleaner is an advanced oral hygiene system having a driver that can power-drive selectable attachments, including elliptical orbital flosser attachment 14, a synergistic multi-motion toothbrush attachment 29, and an anti-halitosis attachment 81. A proper conclusion warrants restating that driver 12 and its attachments have seven significant advantages as outlined in the SUMMARY above. And while the description above is of specific embodiments, these are not intended to be limited in scope to the embodiments shown and described, but rather as some useful examples. Each of the embodiments can give rise to various models and other embodiments.

For example, inclusion of a speed control device for controlling the driver motor speed is recommended and will be very useful for maximizing the benefits of the attachments. Fragrance tablets in the attachments may have a different scent in each attachment. Replacement attachments may have selectable choices of fragrance scents to be driven by the air blower for ambiance. A lamp to illuminate the oral cavity is recommended for being included in the posterior end portion of the driver to be used like a flashlight for oral examination. The lamp can be energized by rechargeable driver battery 36.

The F-shaped tines can alternatively be Y-shaped and/or replacement attachments may have selectable tine shapes. Various types of floss in the flosser attachment may be selectable in replacement attachments. A timer, pressure sensor, or other convenience feature may be added to the driver. The relative size, shape, spacing, or location of the elements of an embodiment may differ from those in the embodiments shown.

Instead of being curved, the blades of the impeller may be radial to operate in either rotational direction. The rotational motion of the toothbrush as expressed in the claims is not intended to limit rotation of the toothbrush in only one direction. Well known mechanical or electrical means for cyclically reversing rotation of a powered toothbrush may be included in the present toothbrush in addition to its novel features shown and described herein. Thus, the scope of the embodiments should be determined by the appended claims and their legal equivalents rather than by the examples given.

What is claimed is:

1. An oral cleaning system comprising:
   a housing,
   a flosser attachment detachably connected to said housing, the flosser attachment having means for supporting a span of dental floss for flossing teeth,
   said housing and said flosser attachment define a contained space, where said contained space includes a rotatably supported floss take-up spool for winding used dental floss thereon and an air blower including a motor drivingly connected to a rotatably supported air impeller, and
   one or more air intake vents for providing air access to said take-up spool, wherein during use, said motor drives said air impeller to draw external air through said one or more air intake vents into the contained space to dry used dental floss thereby inhibiting microbial activity and odor.

2. The oral cleaning system of claim 1 wherein said air impeller includes at least one eccentrically distributed air-driving blade that causes an imbalanced air load on said impeller when driven to rotate and thereby induces secondary cyclic motion to said air impeller and cyclic motion to said span of dental floss for flossing teeth.

3. The oral cleaning system of claim 2 wherein a span of dental floss is held by said means for supporting a span of dental floss, where said air impeller causes cyclic motion of said span of dental floss.

4. The oral cleaning system of claim 3, wherein said air blower includes first and second air discharge ports directed in approximately opposite directions relative to each other and said air blower discharges most impeller-driven air alternately from each of said first and second ports, such that said air blower discharges air from said first port in a first discharge direction approximately opposite to a second discharge direction of said second port and said air blower discharges air from said second port in said second discharge direction approximately opposite to said first discharge direction of said first port for inducing a predetermined pattern of flossing motion to said span of dental floss.

5. The oral cleaning system of claim 3, wherein said air blower includes first and second volutes directed in approximately opposite directions relative to each other and said air blower discharges most impeller-driven air alternately from each of said first and second volutes, such that said air blower discharges air from said first volute in a first discharge direction approximately opposite to a second discharge direction of said second volute and said air blower discharges air from said second volute in said second discharge direction approximately opposite to said first discharge direction of said first volute for inducing a predetermined pattern of flossing motion to said span of dental floss.

6. The oral cleaning system of claim 3, further comprising said air impeller having an eccentric weight positioned opposite at least one eccentrically distributed air-driving blade of a plurality of air-driving blades so that the combination of forces operatively resulting from at least one eccentrically distributed air-driving blade of said plurality of air-driving blades and said eccentric weight enhances said cyclic motion induced to said span of dental floss.

7. The oral cleaning system of claim 1 further comprising said flosser attachment containing a fragrance source positioned within the contained space such that said air blower drives a fragrant scent from said fragrance source into ambient air for sensuous gratification of the cleaner user.

8. The oral cleaning system of claim 1, further comprising a toothbrush attachment being detachably connectable to said housing, said toothbrush attachment including a toothbrush having bristles wherein said motor drives said impeller which imparts orbital motion to said toothbrush about a first axis being approximately perpendicular to the lengths of said bristles, and said motor rotates said toothbrush about a second axis being approximately parallel to the lengths of said bristles, wherein said first and said second axes being transverse to each other to result in synergistic interdental cleaning.

9. The oral cleaning system of claim 1, further comprising an anti-halitosis attachment detachably connectable to a second end of said housing, wherein said second end of said housing is opposite a first end of said housing to which said flosser attachment is detachably connectable and said second end of said housing includes at least one air discharge port, said anti-halitosis attachment includes a nozzle having a distal portion forming toungue scraping device wherein said nozzle being in fluid communication with said at least one air discharge port when connected to said housing whereby during use, air exiting said at least one air discharge port travels through said anti-halitosis attachment and exits from said nozzle onto a user's tongue.

10. The oral cleaning system of claim 9 wherein said air impeller having air driving surfaces predominantly on one side of a plane containing the rotational axis of said air impeller for causing an imbalanced air load on said impeller when driven to rotate and thereby causing cyclic motion beyond rotational motion of said air impeller for inducing cyclic tongue-scraping motion to said tongue scraping device.

11. The oral cleaning system of claim 9 further comprising said anti-halitosis attachment containing a fragrance source positioned within an airflow path for driving a fragrant scent from said fragrance source to a user's tongue.

12. The oral cleaning system of claim 9 wherein said tongue scraping device includes at least one blade for scraping a user's tongue wherein said nozzle includes an elongated air outlet defined by said blade for oxidizing anaerobes.

13. The oral cleaning system of claim 9 wherein said tongue scraping device includes a first scraping blade and a second scraping blade spaced from said first scraping blade wherein said nozzle includes an elongated air outlet defined by said first and second scraping blades for oxidizing anaerobes exposed between tongue papillae by scraping biofilm from a user's tongue with said first and second scraping blades.

14. An oral cleaning system comprising:
a housing including an air blower having a motor drivingly connected to a rotatably supported air impeller,
a flosser attachment detachably connected to said housing, the flosser attachment having a pair of spaced tines for supporting a span of dental floss to floss teeth and a capsule at least partially enclosing a rotatably supported floss take-up spool for winding used dental floss thereon, and
one or more air intake vents for providing air access to said take-up spool, wherein during use, said motor drives said air impeller to draw external air into said oral cleaning system through said one or more air intake vents to dry used dental floss, thereby inhibiting microbial activity and odor.

15. The oral cleaning system of claim 14, wherein said air impeller includes at least one eccentrically distributed air driving blade that causes an imbalanced air load on said air impeller when driven to rotate and thereby induces cyclic motion to a span of dental floss held by said pair of spaced tines for supporting a span of dental floss to floss teeth.

16. The oral cleaning system of claim 14 further comprising an anti-halitosis attachment detachably connectable to a second end of said housing, wherein said second end of said housing is opposite a first end of said housing to which said flosser attachment is detachably connectable and said second end of said housing includes at least one air discharge port, said anti-halitosis attachment includes a nozzle being in fluid communication with said at least one air discharge port when connected to said housing, said nozzle having an elongate air outlet to emit a broad airstream, said elongate air outlet being at least partially defined by a tongue scraper blade for engaging said tongue and scraping biofilm therefrom thereby exposing anaerobic bacteria to oxidation by said airstream.

17. The oral cleaning system of claim 14, wherein said air impeller includes a rotational axis contained lengthwise in a plane, said impeller having air driving surfaces predominantly on one side of said plane that cause an imbalanced air load on said impeller when driven to rotate and thereby induces secondary cyclic motion to said impeller and cyclic motion to a span of dental floss held by said pair of spaced tines for supporting a span of dental floss to floss teeth.

18. The oral cleaning system of claim 17, wherein said air blower includes first and second air discharge ports directed in approximately opposite directions relative to each other and said air blower discharges most impeller-driven air alternately from each of said first and second ports, such that said air blower discharges air from said first port in a first discharge direction approximately opposite to a second discharge direction of said second port and said air blower discharges air from said second port in said second discharge direction approximately opposite to said first discharge direction of said first port for inducing a predetermined pattern of flossing motion to a span of dental floss held by said pair of spaced tines for supporting a span of dental floss.

* * * * *